United States Patent [19]

Proksa et al.

[11] Patent Number: 5,451,376
[45] Date of Patent: Sep. 19, 1995

[54] PROCESS AND APPARATUS FOR REPROCESSING POLYURETHANE FOAM WASTES, IN PARTICULAR FLEXIBLE FOAM WASTES, FOR RECYCLING AS ADDITIVES IN THE PRODUCTION OF POLYURETHANE

[75] Inventors: Ferdinand Proksa, Leverkusen; Hans-Michael Sulzbach, Königswinter; Ferdinand Althausen, Neunkirchen; Jürgen Wirth, Köln; Reiner Raffel, Siegburg, all of Germany

[73] Assignee: Maschinenfabrik Hennecke GmbH, Leverkusen, Germany

[21] Appl. No.: 237,543

[22] Filed: May 3, 1994

[30] Foreign Application Priority Data

May 14, 1993 [DE] Germany .................. 43 16 190.1

[51] Int. Cl.⁶ .................. C08F 2/00; B01J 8/08; B28B 1/50; B02C 23/00
[52] U.S. Cl. .................. 422/131; 422/133; 422/230; 422/234; 425/4 R; 425/817 R; 241/97; 241/101.8; 241/152.2
[58] Field of Search .................. 422/131, 133, 230, 234; 425/4 R, 817 R; 241/97, 152.2, 101.8; 521/40, 49

[56] References Cited

U.S. PATENT DOCUMENTS

| | | | |
|---|---|---|---|
| 3,437,276 | 8/1969 | Gurley, Jr. et al. | 241/97 |
| 3,852,191 | 12/1974 | Zucker et al. | 210/71 |
| 4,242,306 | 12/1980 | Kreuer et al. | 422/133 |
| 4,339,358 | 7/1982 | Schultz | 521/49.5 |
| 4,511,680 | 4/1985 | Niederdellmann et al. | 521/49.5 |
| 4,773,602 | 9/1988 | Rossler | 241/152 A |
| 4,854,713 | 8/1989 | Soechtig | 366/132 |
| 5,093,084 | 3/1992 | Boden et al. | 422/133 |
| 5,298,530 | 3/1994 | Gamble et al. | 521/48.5 |

FOREIGN PATENT DOCUMENTS

| | | |
|---|---|---|
| 0514106A3 | 11/1992 | European Pat. Off. . |
| 4025102A1 | 2/1992 | Germany . |
| 4025102 | 2/1992 | Germany . |
| 4030639C1 | 2/1992 | Germany . |
| 1435210 | 5/1976 | United Kingdom . |
| WO93/19848 | 10/1993 | WIPO . |

OTHER PUBLICATIONS

Kunstoffe, Bd. 81, Nr. 10, Oct. 1991, Munchen de Seiten 928–933—Dipl.-Ing. Hans Michael Sulzbach 'Schüttgut in Pur-Reactionsgiessprozessen Verarbeiten'.
Database WPI—Section Ch, Week 9305, Derwent Publications Ltd., London, GB; Class AGR, AN 93-040681 CO5! & JP-A 04366119 (Mitisubishi Kasei Dow K.K.) Dec. 18, 1992.

Primary Examiner—Robert J. Warden
Assistant Examiner—Christopher Y. Kim
Attorney, Agent, or Firm—Joseph C. Gil

[57] ABSTRACT

In a fine comminution apparatus arranged downstream of a coarse comminution apparatus, polyurethane foam wastes can be comminuted to the desired particle size for recycling as an additive in the production of polyurethane, in a low-dust and energy-saving manner, by carrying out the fine comminution preferably by repeatedly forcing a mixture of the coarsely comminuted material and one of the reaction components through a nozzle or through a plurality of nozzles.

5 Claims, 3 Drawing Sheets

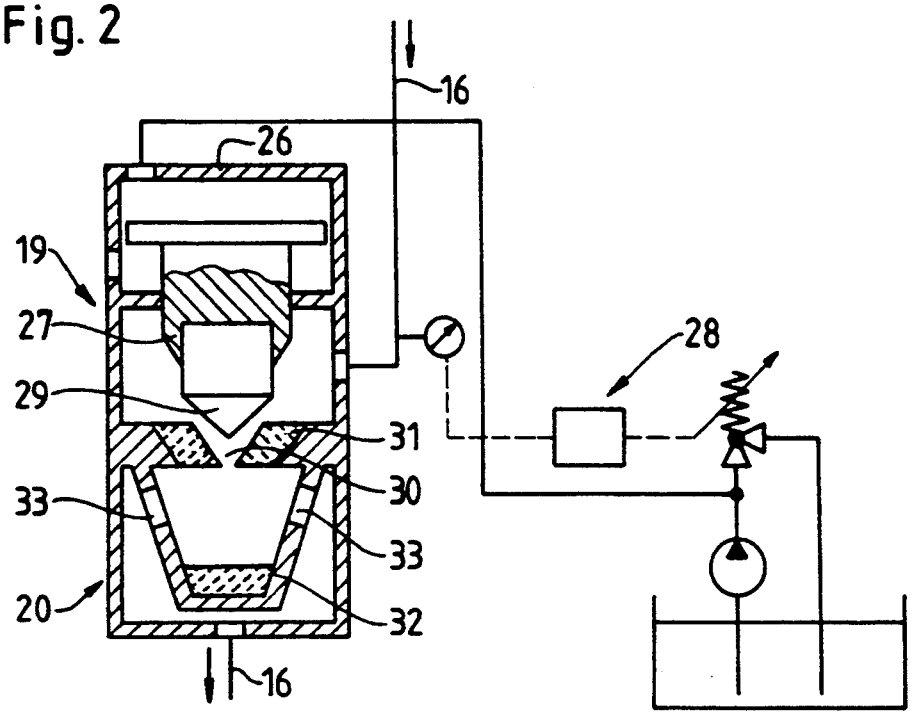
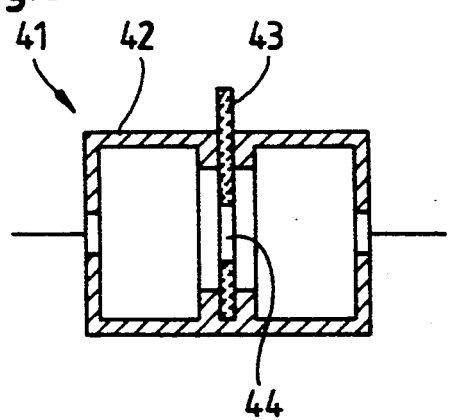

PROCESS AND APPARATUS FOR REPROCESSING POLYURETHANE FOAM WASTES, IN PARTICULAR FLEXIBLE FOAM WASTES, FOR RECYCLING AS ADDITIVES IN THE PRODUCTION OF POLYURETHANE

BACKGROUND OF THE INVENTION

The present invention relates to a process and an apparatus for reprocessing polyurethane foam wastes, and in particular, flexible foam wastes, for recycling as an additive in the production of polyurethane from polyol and isocyanate, wherein the wastes are first comminuted coarsely, the particles obtained are mixed with one of the reaction components, and the latter mixture undergoes fine comminution. A similar process is described in German Auslegeschrift 2,339,752 (which corresponds to British Patent 1,435,210)

From German DE-B 4,025,102 it is also known to comminute polyurethane foam waste to a particle size below 10 mm, with re-use after mixing with foam-forming one-component prepolymers.

Polyurethane foam wastes arise, for example, during polyurethane foam trimming and also during foam molding as a result of escape of the product from the vents and in the plane of the parting line. Such wastes are reprocessable and can be recycled in some fields of application, recycling can take place only when the wastes are comminuted finely, that is to say, are in powder form. Coarse comminution presents no problems and is achieved, for example, by chopping, crushing or grinding. According to the above noted '752 publication, fine comminution can be attained by wet grinding. This involves considerable plant cost and high energy requirements. Dry grinding has also been used for fine comminution of foam waste with an energy requirement of from 0.15 to 0.2 kWh/kg, being more favorable than the wet grinding process. However, plant cost is again very high bemuse of considerable dust formation.

The object of the present invention was therefore to carry out a low-dust, fine comminution with a lower plant cost and lower energy cost.

BRIEF DESCRIPTION OF THE DRAWINGS.

FIG. 2 shows an enlarged cross section of the injection nozzle and impact chamber of section A of FIG. 1.

FIG. 3 shows a cross section of a nozzle having changeable flow area.

DESCRIPTION OF THE INVENTION

Figure 1:
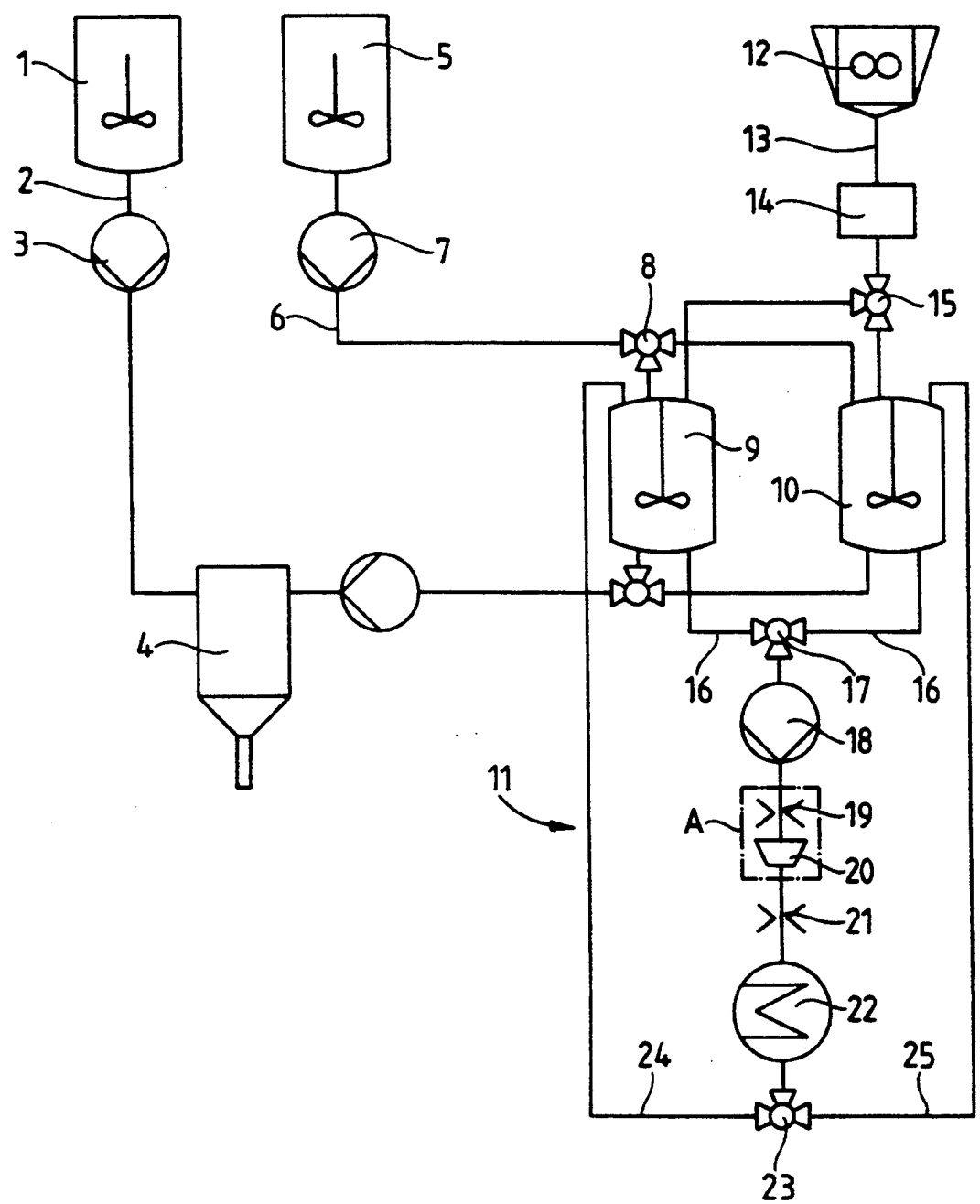
FIG. 1 shows a first embodiment for discontinuous polyurethane production.

According to the invention, the above noted object was achieved in a process where coarse comminution takes place down to a maximum particle size of 10 mm. The particles thus obtained are dosed into a reaction component and are homogenized therewith. The resultant mixture is forced under pressure through a nozzle for fine comminution.

More particularly, the present invention is directed to a process for recycling polyurethane foam wastes comprising:

a) comminuting said waste to a maximum particle size of 10 mm in a coarse comminution stage, b) mixing the product of step a) into one reaction component for producing a polyurethane product to form a mixture of waste particles in said reactant, said reaction component being selected from the group consisting of polyol and polyisocyanate, c) forcing said mixture through a nozzle to finely comminute said waste particles, d) mixing the product of step c) with the other of said components, and e) allowing the resulting mixture to react to form a polyurethane product.

By following the process of the present invention, a favorable energy requirement is achieved in the fine comminution stage, and dust formation is avoided. The powder prepared is directly dispersed in the reaction component as a filler, thus obviating the need for an additional mixing stage. The coarsely comminuted material can naturally be stored until required, but may alternatively be supplied directly to the fine comminution stage after mixing with the reaction component. It is in principle possible to add the coarse material both to the polyol and to the isocyanate component. However, it is preferable to add the particles to the polyol component, because there are frequently present in polyurethane foams free valencies which would react with isocyanate, giving rise to the possibility of lump formation.

It was entirely surprising that the novel process enables flexible foam flakes to be comminuted finely particularly effectively, since the elasticity of flexible foam wastes especially is extremely demanding as regards comminution processes. It has surprisingly been found that the foam particles burst apart on being forced through the nozzle. The maximum size of the coarse particles should be preferably 10 mm, particularly preferably from 2 to 5 mm. An injection velocity of approximately 100 to 500 m/s is preferably adjusted for the purpose, equivalent to an injection pressure of up to about 2000 bar.

It has been found that the energy requirement of the novel comminution stage is particularly favorable. A paddle mixer vessel preferably serves as the homogenizing apparatus, which may simultaneously serve as a supply vessel or for interim storage.

The reaction component can normally be charged with the requisite quantity of coarsely comminuted waste. It is, however, also possible to dilute the mixture, after it leaves the fine comminution stage and before further processing, by further addition of reaction component, in order, where necessary, to ensure correct dosing in relation to the second reaction component.

According to one embodiment of the invention, the mixture is circulated and is forced repeatedly through the nozzle. It has been found that a further comminution takes place with every pass. The injection pressure is preferably increased with each pass and/or the flow area of the nozzle is reduced for each new pass. These measures afford the possibility of influencing the fine comminution action depending on the structure of the waste material, for example its elasticity and particle size. The injection pressure is preferably held constant during one pass, thus optimizing the fine comminution operation in terms of the particle size spectrum.

Instead of repeatedly circulating the mixture and forcing it through the nozzle, it is alternatively forced through a plurality of nozzles disposed one behind the other. This enables the same effect to be achieved as in repeated circulation of the mixture. Here too it is expedient to decrease the flow area from one nozzle to the next. If pressure losses are excessive, additional pressure pumps will be provided between the nozzles which will be operated if necessary at different injection pressures.

It has proved particularly advantageous to mix the reaction component with the coarsely comminuted waste in a weight ratio of from 100:10 to 100:100, preferably up to 100:20. Of the proportion of waste is high, the coarsely comminuted waste is advantageously added in a plurality of stages to the proportion of waste already in fine comminution. The mixing ratio which is suitable depends mainly on the density and elasticity of the wastes. Less liquid will be required with flexible foam wastes than with rigid foam wastes.

The coarse comminution should naturally already result in as small a particle size as possible. The maximum particle size should not exceed 10 mm. Fine comminution may be carried out particularly successfully with particle sizes of approximately 2 to 5 mm.

According to one particularly advantageous embodiment of the novel process, the particles arising from the coarse comminution are dosed directly into the stream of one of the reaction components supplied to a mixing head, and are homogenized therein. The stream thus charged is pumped directly into the mixing head. This on-line method of operation has the advantage that no particular homogenizing vessel is necessary. This variant is suitable only if the end product is manufactured in a plant which operates continuously. This embodiment is unsuitable in the case of molds having their own mixing head, because of the risk of deposits forming in piping during idle times.

The apparatus suitable for carrying out the process according to the invention for reprocessing polyurethane foam wastes, in particular flexible foam wastes, for recycling as an additive in the production of polyurethane from polyol and isocyanate comprises:
  a) a coarse comminution apparatus, with pipes leading from said coarse comminution apparatus to
  b) a homogenization apparatus, with pipes leading from said homogenization apparatus to
  c) a nozzle, with a pressure pump located between said homogenization apparatus and said nozzle.

Alternatively, the apparatus comprises:
  a) a coarse comminution apparatus, with a pipe leading from said coarse comminution apparatus to
  b) a feed pipe leading from a storage vessel for a polyurethane-forming reactant, with said feed pipe leading to
  c) a nozzle, with a pressure pump located downstream of the point where said feed pipe meets the pipe leading from said coarse comminution apparatus.

The novelty resides in the fact that the fine comminution apparatus comprises at least one nozzle and in that a pressure pump is arranged upstream of the nozzle.

In comparison with the wet grinding process and apparatus disclosed by the '752, the novel apparatus is of substantially simpler construction and also operates substantially more economically in the fine comminution stage. Since waste foams result in increased wear, the nozzle is preferably provided with a hard alloy coating or is fashioned in ceramic material.

There is preferably arranged downstream of the nozzle, a return line leading to the homogenizing apparatus. This construction enables the mixture to be circulated and forced repeatedly through the nozzle.

The delivery pressure of the pressure pump is preferably adjustable. This enables the injection pressure to be adapted to individual requirements. For example, a higher delivery pressure will be applied when particle size is smaller.

The flow area of the nozzle is preferably also adjustable. This measure also enables the fine comminution operation to be optimized.

The flow area of the nozzle is preferably selected so as to be slightly larger than the size of the particles to be forced through. This reduces the risk of clogging.

According to one embodiment, there is disposed one behind the other a plurality of nozzles. This avoids repeated circulation. If pressure losses in the nozzles are excessive, additional pressure pumps will be disposed between the nozzles. The nozzles may naturally also exhibit a diminishing flow area, thus forcing the mixture through smaller and smaller nozzle openings.

An impact chamber is preferably arranged downstream of the nozzles. This affords the advantage of achieving an additional comminution action resulting from the impact action. This action is further reinforced in that the outlet openings are provided laterally at the impact chamber entry point, the jet of mixture entering the impact chamber thus generating turbulence in the returning mixture, with a simultaneous excellent homogenization taking place.

A pressure regulator is preferably associated with the nozzle. This affords the advantage of enabling the injection pressure to be held constant.

According to another embodiment, there are disposed two homogenizing apparatus which function in tandem. In this way, availability of an adequate supply of mixture is ensured at all times for further processing, as is the possibility of taking mixture from one homogenizing apparatus while the mixture is circulated by way of the other for the purpose of fine comminution.

In a further embodiment, the apparatus is disposed directly in a feed line of one of the reaction components, which leads to a mixing head of a foaming apparatus, with the homogenizing apparatus comprising a static mixer or paddle mixer. This enables the construction of the homogenizing apparatus to be substantially simplified in the case of continuously operating plant, such as are employed in the manufacture of polyurethane foam webs on continuous laminators or in the manufacture of foam slab stock.

The invention is explained below in greater detail by two embodiments of the apparatus which is represented purely diagrammatically in the drawings.

In FIGS. 1 and 2, a feed line 2 leads from a supply vessel 1 for isocyanate by way of a dosing pump 3 to a mixing head 4. A feed line 6 leads from a supply vessel 5 for polyol by way of a dosing pump 7 and a reversing valve 8 to two homogenizing apparatus 9, 10 working in tandem, which are in the form of paddle mixer vessels. The latter are a constituent part of a fine comminution apparatus 11 upstream whereof there is arranged a coarse comminution apparatus 12 in the form of a roll mill. A delivery pipe 13 leads from the coarse comminution apparatus 12 by way of a dosing and delivery unit 14 and a reversing valve 15, also to the homogenizing apparatus 9, 10. There leads therefrom a feed line 16 by way of a reversing valve 17 and a pressure pump 18 having adjustable delivery pressure to a nozzle 19 with impact chamber 20. There are arranged downstream thereof in sequence a second nozzle 21, a heat exchanger 22 and a reversing valve 23 which lead back to the homogenizing apparatus 9 and 10 via return lines 24, 25. Nozzle 19 and impact chamber 20 are integrated into a housing 26 (FIG. 2) whereinto there opens laterally the feed line 16. The nozzle 19 comprises a hydraulically activatable nozzle pin 27 having a pressure regulating device 28. The point of the nozzle pin 27 exhibits a hard alloy insert 29 and the nozzle opening 30 is disposed in a ceramic 31. There is located downstream of the nozzle opening the impact chamber 20 whereof the base comprises a ceramic plate 32. The outlet openings 33 of the impact chamber 20 are disposed laterally towards the nozzle opening 30.

In FIG. 3, the nozzle 41 comprises a housing 42 wherein there is disposed an exchangeable slide 43 which is provided with a nozzle opening 44. The said slide 43 may be exchanged for other slides having nozzle openings 44 of a different size.

Figure 4:
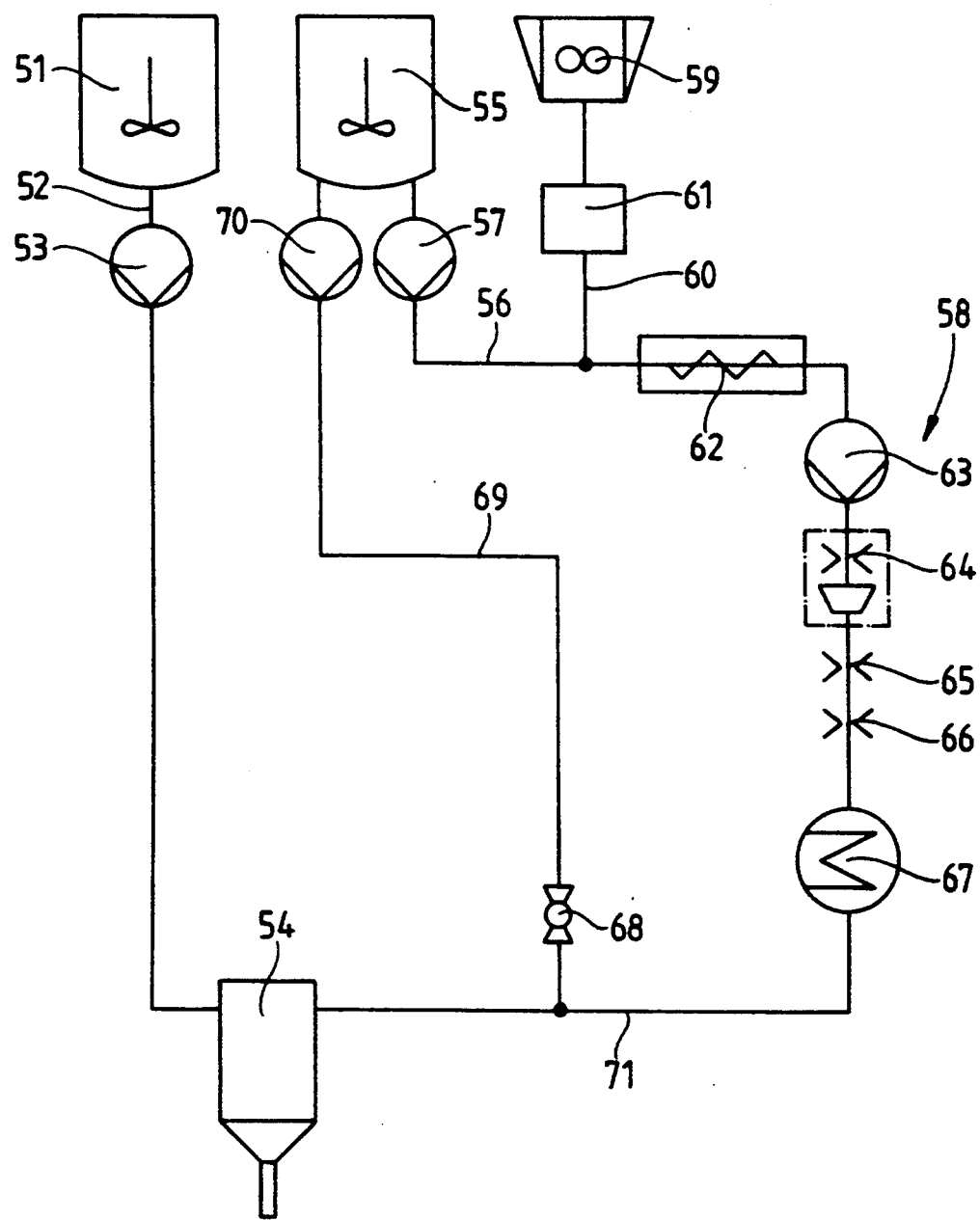
FIG. 4 shows a second embodiment for continuous polyurethane production.

In FIG. 4, a feed line 52 leads from a supply vessel 51 for isocyanate by way of a dosing pump 53 to a mixing head 54. A feed line 56 leads from a supply vessel 55 for polyol by way of a dosing pump 57 to a fine comminution apparatus 58 upstream whereof there is arranged a coarse comminution apparatus 59 in the form of a roll mill. There leads therefrom into the feed line 56 by way of a dosing and feeding unit 61 a delivery pipe 60. The fine comminution apparatus 58 comprises the homogenizing apparatus 62 in the form of a static or paddle mixer which is disposed in the feed line 56. Downstream thereof there are arranged in sequence a pressure pump 63 and three nozzles 64, 65, 66, with each successive nozzle 65, 66 exhibiting a flow area which is smaller than that which precedes it, followed finally by another heat exchanger 67. There opens into the feed line 71 between pressure pump 63 and mixing head 54 a separate feed line 69, by means of a connecting valve 68, by way whereof pure component may be dosed by means of the dosing pump 70 in order to enable the mixture of reaction component and solid to be further diluted or to be varied.

The invention is further illustrated but is not intended to be limited by the following examples in which all parts and percentages are by weight unless otherwise specified.

EXAMPLES

Example 1

The apparatus of FIG. 1 is used, but for this experiment using only the homogenizing apparatus 9 and only the nozzle 19 with impact chamber 20. An axial piston pump of 0.88 efficiency is employed as the pressure pump 18. The coarse comminution apparatus 12 delivers 4 kg flexible foam flakes at a particle size of from 3 to 5 mm. They are mixed homogeneously with 20 kg polyol in the homogenizing apparatus 9. This 24 kg mixture is then forced through the nozzle 19 five times in succession at a rate of 8 kg/min and 150 bar pressure, with the 150 bar injection pressure held constant during each pass. After the first pass a particle size of from 0.5 to 5 mm is obtained; after the second a particle size of from 0.3 to 2 mm; after the third a particle size of from 0.2 to 1 mm; after the fourth a particle size of from 0.1 to 0.5 mm; and finally after the fifth pass the desired particle size of from 0.05 to 0.2 mm is obtained. The energy requirement for these five passes was 0.133 kWh/kg flexible foam flakes. Working with a less efficient pressure pump, for example a gear pump of only 0.5 efficiency, increases the energy requirement to 0.23 kWh/kg flexible foam flakes.

Example 2

The procedure is as in Example 1, but with the pressure increased by 25 bar after each pass. The desired particle size of from 0.05 to 0.2 mm is achieved after only four passes. The energy requirement remains of the same order. A time saving of 20% is, however, achieved.

Example 3

The procedure is as in Example 1, but with processing of rigid foam flakes. The desired particle size of from 0.05 to 0.2 mm can be achieved in this case after only five passes. The pressure required in this instance is, however, around 200 bar. That is to say, the energy requirement is 0.177 kWh/kg rigid foam flakes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for reprocessing polyurethane foam waste for recycling as an additive in the production of polyurethane from polyol and isocyanate comprising:
   a) a comminution apparatus for comminuting said waste to a maximum particle size of 10 mm, with pipes leading from said comminution apparatus to,
   b) a homogenization apparatus where waste particles are mixed with a polyurethane-forming reactant, with pipes leading from said homogenization apparatus to,
   c) a nozzle,
   d) a pressure pump for forcing the mixture of waste particles and reactant through said nozzle, said pressure pump located between said homogenization apparatus and said nozzle, and
   e) pipes leading from said nozzle back into said homogenization apparatus.

2. The apparatus of claim 1, wherein the flow area of the nozzle is selected so as to be larger than the particles to be forced therethrough.

3. The apparatus of claim 1, wherein an impact chamber is arranged downstream of said nozzle.

4. The apparatus of claim 1, wherein one or more additional nozzles are disposed downstream of said nozzle c) such that the mixture of waste particles and reactant are forced through each nozzle, and wherein said pipes e) lead from the last nozzle back into said homogenization apparatus.

5. An apparatus for reprocessing polyurethane foam waste for recycling as an additive in the production of polyurethane from polyol and isocyanate comprising:
   a) a comminution apparatus for comminuting said waste to a maximum particle size of 10 mm, with pipes leading from said comminution apparatus to
   b) a feed pipe which leads from a storage vessel for a polyurethane-forming reactant with said feed pipe leading to
   c) a nozzle,
   d) a pressure pump for forcing a mixture of waste particles and polyurethane-forming reactant through said nozzle, said pressure pump located downstream of the point where said feed pipe meets the pipe leading from said comminution apparatus, and
   e) pipes leading from said nozzle to a mixing head where the polyurethane-forming reactants are mixed.

* * * * *